United States Patent [19]

Tavano

[11] Patent Number: 4,478,013
[45] Date of Patent: Oct. 23, 1984

[54] SLOPED GLAZING STRUCTURE

[76] Inventor: John B. Tavano, 28 Edgewood Dr., Torrington, Conn. 06790

[21] Appl. No.: 396,620

[22] Filed: Jul. 9, 1982

[51] Int. Cl.³ .............................................. E04B 7/02
[52] U.S. Cl. ......................................... 52/92; 52/461; 52/475
[58] Field of Search ................. 52/92, 82, 90, 95, 488, 52/235, 475, 461, 775, 200

[56] References Cited

U.S. PATENT DOCUMENTS

| | | | |
|---|---|---|---|
| 2,803,321 | 8/1957 | Fox et al. | 52/461 X |
| 3,844,087 | 10/1974 | Schultz et al. | 52/200 |
| 4,070,806 | 1/1978 | Hubbard | 52/95 |
| 4,114,330 | 9/1978 | Sukolics | 52/461 X |
| 4,205,496 | 6/1980 | Heirich | 52/90 X |
| 4,296,576 | 10/1981 | Rice, Jr. et al. | 52/90 |
| 4,327,532 | 5/1982 | Matthews | 52/92 |

Primary Examiner—Carl D. Friedman
Attorney, Agent, or Firm—McCormick, Paulding & Huber

[57] ABSTRACT

Extruded aluminum members provide a sloped framework for supporting glazed panels in an inclined or sloped roof structure. A sill has a flat upper surface and upwardly sloping rafters rest on the sill and have channel defining portions to support the panels and to provide a passageway which moves moisture toward the flat sill. Purlin means provide a moisture proof joint for the panels between the rafters, and stop means at the sill and at the ridge of the roof structure provide a clean appearance for the resulting structure.

7 Claims, 7 Drawing Figures

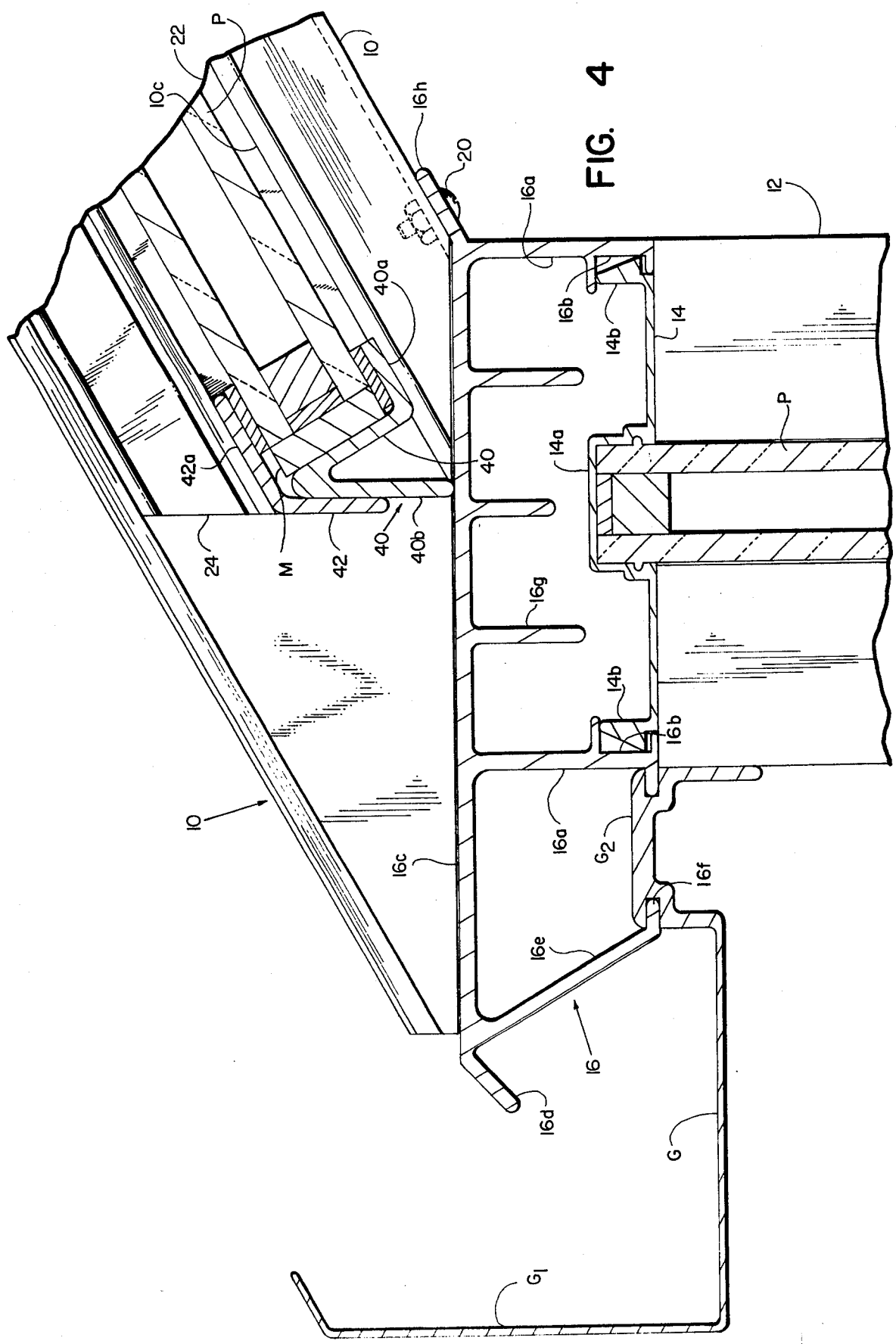

SLOPED GLAZING STRUCTURE

BACKGROUND OF INVENTION

This invention relates generally to a sloped wall or roof structure for supporting glazing panels of the type generally used in vertical curtain wall systems.

Prior art sloped glazing structures generally employ rafters which form a framework for the panels. However, prior art structures suffer from the disadvantage that these panels are generally made of glass so that they expand and contract at a different rate than the metal rafters, such rafters generally being fabricated from aluminum. This difference in the rates of expansion and contraction can contribute to the problems created by water collected along the rafters, and on the underside or inside of the glazing panel, in that the structure must be provided with means for carrying off this moisture to a gutter system associated with such a sloped glazing structure.

Prior art U.S. Pat. No. 4,070,806 illustrates a rather complicated solution to this problem wherein an internal gutter is provided within the cornice portion of the sloping roof structure, and wherein the rafters are equipped with integrally formed channels or gutters for carrying the water to the horizontally extending gutter at the roof cornice.

The present invention seeks to solve the problem to which the disclosure in prior art U.S. Pat. No. 4,070,806 is directed without such an internal gutter and without sacrifice to the complexity of the joints required between the rafters and the existing vertical curtain wall structure. Whereas many sloped glazing structures require mitering and welding of joints between the inclined rafters, and between the rafters and the purlins, as well as between the rafters and the vertical curtain wall itself, the relatively simple structure of the present invention avoids this necessity, and also avoids the complex internal gutter system of the above mentioned prior art patent.

Another advantage of the present invention is the unique horizontally extending top rail configuration which facilitates joining of the sloped glazing structure to an existing vertical wall. Not only does the present disclosure provide a conventional external gutter, which can receive moisture from the underside of the glass panels in the sloped glazing structure, but the configuration of the cornice structure itself, particularly the top rail portion of the sloped glazing structure, provides a very pleasing appearance. In addition to including this unique means for disposal of water collected by the uniquely configured rafters and purlins utilized in the present structure the present invention provides a more efficient and economic overall roof structure.

SUMMARY OF THE INVENTION

The above summarized objects and advantages of the disclosure herein are accomplished in a new and improved sloped glazing structure for buildings or the like which comprises a plurality of conventionally configured glazed panels which are supported between upwardly inclined rafters of inverted T-shape such that laterally projecting lower portions of each T-shaped rafter define channels on either side of a vertically extending stem portion of the T-shape rafter. The lower end of each rafter is supported on a horizontally extending sill, which sill has an underside adapted to receive a conventional curtain wall structure.

The sill includes an edge portion projecting beyond the curtain wall receiving underside thereof, which projecting portion forms at least a part of a conventional external gutter. The glazed panels are supported on lands of the channel defining portions of the T-shape rafter and each such rafter further includes an integral cap portion defined by laterally projecting flanges along the upper edge of the stem portion thereof. L-shaped glazing stops are secured to the rafter stem portions below this cap portion and extend approximately the full length of the rafters thereby presenting a pleasing appearance from the exterior of the resulting structure.

Horizontally extending purlins are provided between the rafters and each purlin includes mating division bars at least the lower one of which bars has end portions supported on the same channel defining portion of the T-shape rafter which receive the glass panel. These purlins are so configured that any accumulated moisture will tend to be carried away by the above mentioned inclined channel portions of the T-shape rafters. Stop plate means is provided adjacent the upper surface of the sill for supporting the lower edge of the lowermost glazed panel, and stop ridge means is provided between the upper ends of the rafters adjacent a J-shaped top rail at the upper edge of the sloped glazing structure. The top rail supports the structure from an existing wall to which it is mounted. The J-shaped top rail has lands to abut the existing vertical wall and a horizontally extending opening of channel shape to receive the upper ends of the rafters.

BRIEF DESCRIPTION OF THE DRAWINGS

FIG. 4 is a sectional view illustrating the lower sill portion of the sloped glazing structure drawn to a larger scale than that of FIG. 2.

FIGS. 4, 5 and 6 are enlarged views of the general areas revealed in FIG. 2 and 4, 5 and 6 respectively.

DETAILED DESCRIPTION

Figure 1:
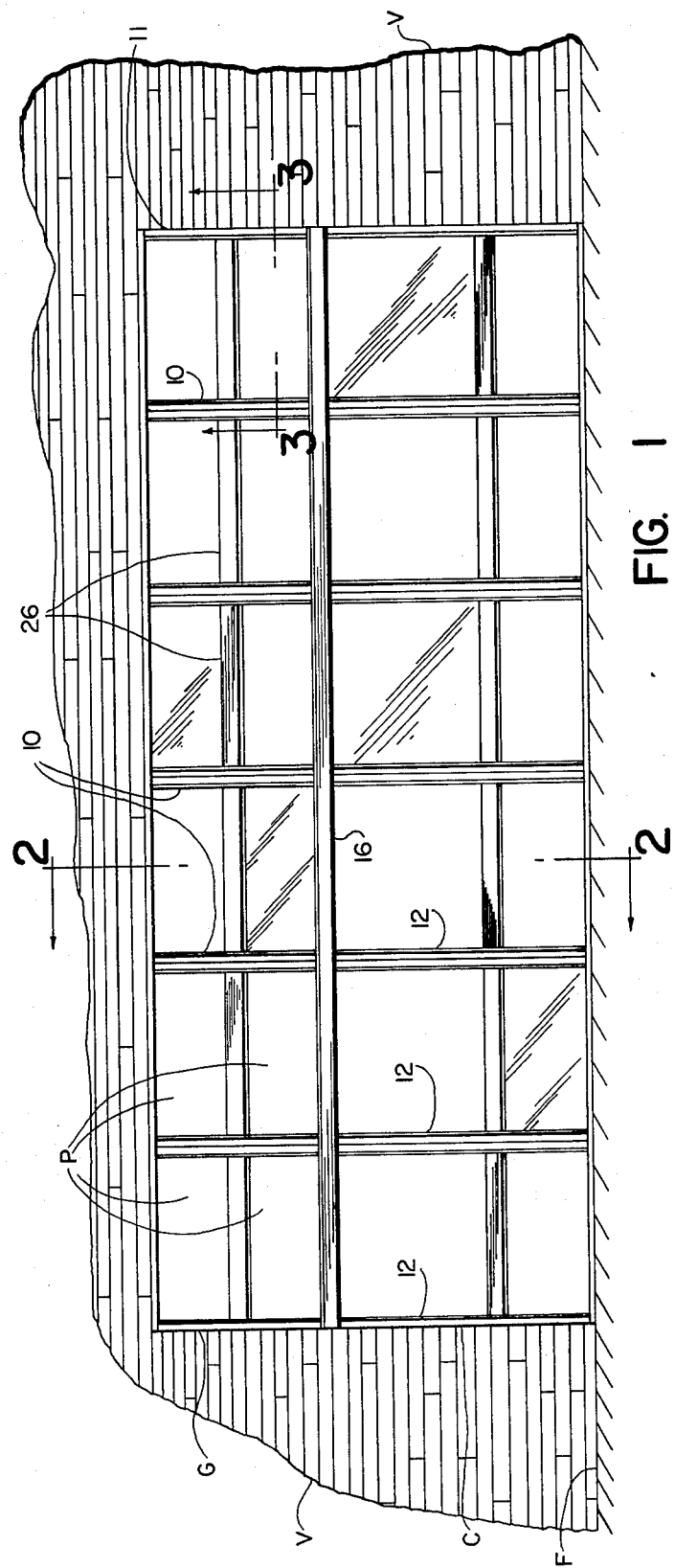
FIG. 1 is a front elevational view of a sloped glazing structure provided in association with an existing vertically extending wall and adapted to be mated with a vertically extending glass curtain wall to provide a glass enclosure.

Turning now to the drawings in greater detail, FIG. 1 illustrates an existing vertical wall V which may be faced with any suitable decorative material such as clapboard shaped vertical siding or other equivalent facing means. A horizontally extending floor F provides a foundation for supporting a conventional vertically extending curtain wall C spaced forwardly of the wall V. The curtain wall C is of conventional construction and suitably anchored to the foundation or floor F in accordance with conventional practice.

Figure 2:
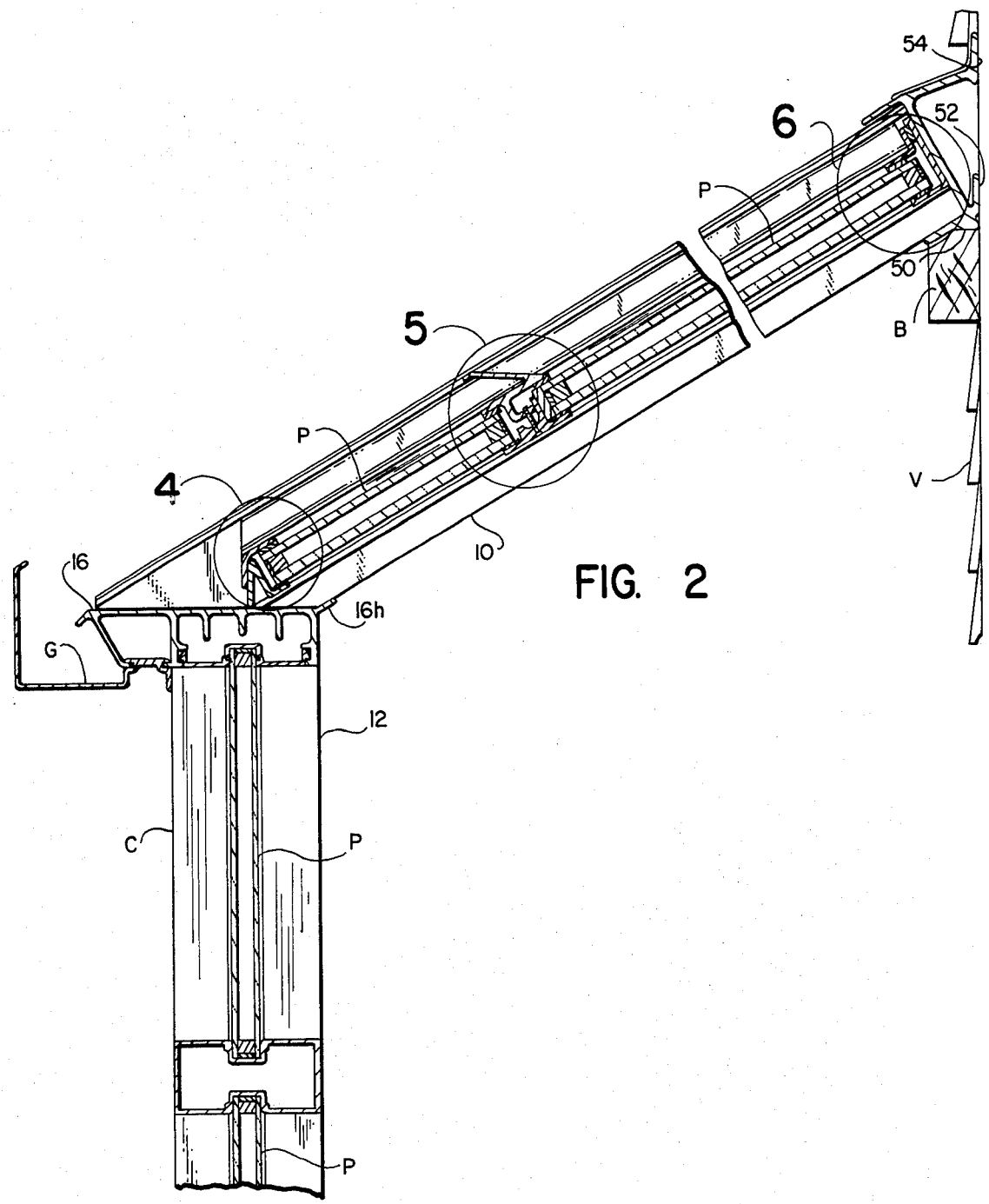
FIG. 2 is a vertical sectional view taken generally on the line 2—2 of FIG. 1.

In accordance with the present invention a sloped roof or glazing structure G is provided between the vertically extending wall V and the curtain wall C as best illustrated in FIG. 2. The vertically extending wall V is parallel to the vertically extending curtain wall C and spaced therefrom by a suitable distance which may be such as to enclose the desired space required. Any number of glazing panels P, P may be supported between the inclined rafters 10, 10. As shown in FIG. 1 two such panels are provided between each adjacent pair of rafters but it will be apparent that other configurations can be accommodated depending upon the length of and spacing between the rafters 10, 10, as well as upon the cross sectional dimensions and load bearing considerations of the rafters themselves.

Each panel P preferably comprises a double or triple glazed structure of conventional configuration similar to that utilized in conventional curtain wall structures. Depending upon the design requirements of a particular installation these glazing panels may be of somewhat thicker glass than utilized in the curtain wall structure C, or in the alternative single glazing may be provided if environmental conditions so permit. In northern climates triple glazing may be preferred in order to reduce the heat loss at night from long wave radiation cooling. During daytime hours it will be apparent that the sloped glazing structure illustrated will provide a very efficient passive solar heating structure suitable for greenhouses, patio enclosures, and commercial additions to existing buildings such as banks, schools, factories or professional buildings.

In a conventional glass curtain wall structure such as illustrated at C in FIG. 2 the uppermost glass panel P is generally supported between vertically extending uprights 12, 12 and the top plate for such a conventional curtain wall generally includes a downwardly open recess or channel to receive an extruded member, such as illustrated at 14 in FIG. 4, which insert 14 has a downwardly open channel defining portion 14a for receiving the glass panel P and which has end portions 14b adapted to be received in openings provided for this purpose in a conventional plate (not shown). In place of such a plate the present invention calls for a horizontally extending sill 16 which sill itself defines a depending channel as shown and which channel has depending side flanges or legs 16a, 16a serving the same purpose as a conventional curtain wall upper plate. Thus, these depending legs 16a, 16a have laterally inwardly open cavities 16b, 16b for receiving the end portions 14b of the insert 14 described above.

Still with reference to the sill 16 it will be apparent that this member is of extruded aluminum as are all of the structural components to be described with reference to a sloped glazing structure as defined herein. This sill member 16 extends horizontally and the full length of the structure illustrated in FIG. 1, and includes a generally flat horizontally extending upper surface 16c at least a portion of which surface extends forwardly beyond the depending channel for receiving the curtain wall C. The forward edge of the sill 16c defines a drip edge 16d and a downwardly and rearwardly inclined leg 16e of the sill cooperates with the outer depending leg 16b referred to previously to define a small opening 16f. This opening 16f is adapted to slidably receive an extruded gutter G. Said gutter G has a vertically extending flat portion, indicated generally at G1, a horizontally extending portion, indicated generally at G, and a rear portion G2 which is adapted to snugly fit within the slot 16f in the horizontally extending sill 16. Finally, and still with reference to the sill 16 stiffening flanges 16g may be provided inside the depending channel portion which receives the insert 14.

Figure 3:
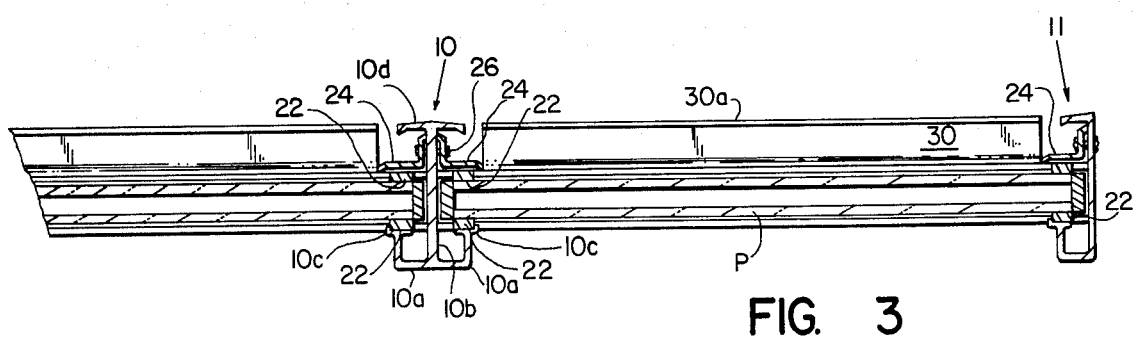
FIG. 3 is a sectional view through the sloped glazing structure being taken generally on the line 3—3 of FIG. 1.
Figure 6:
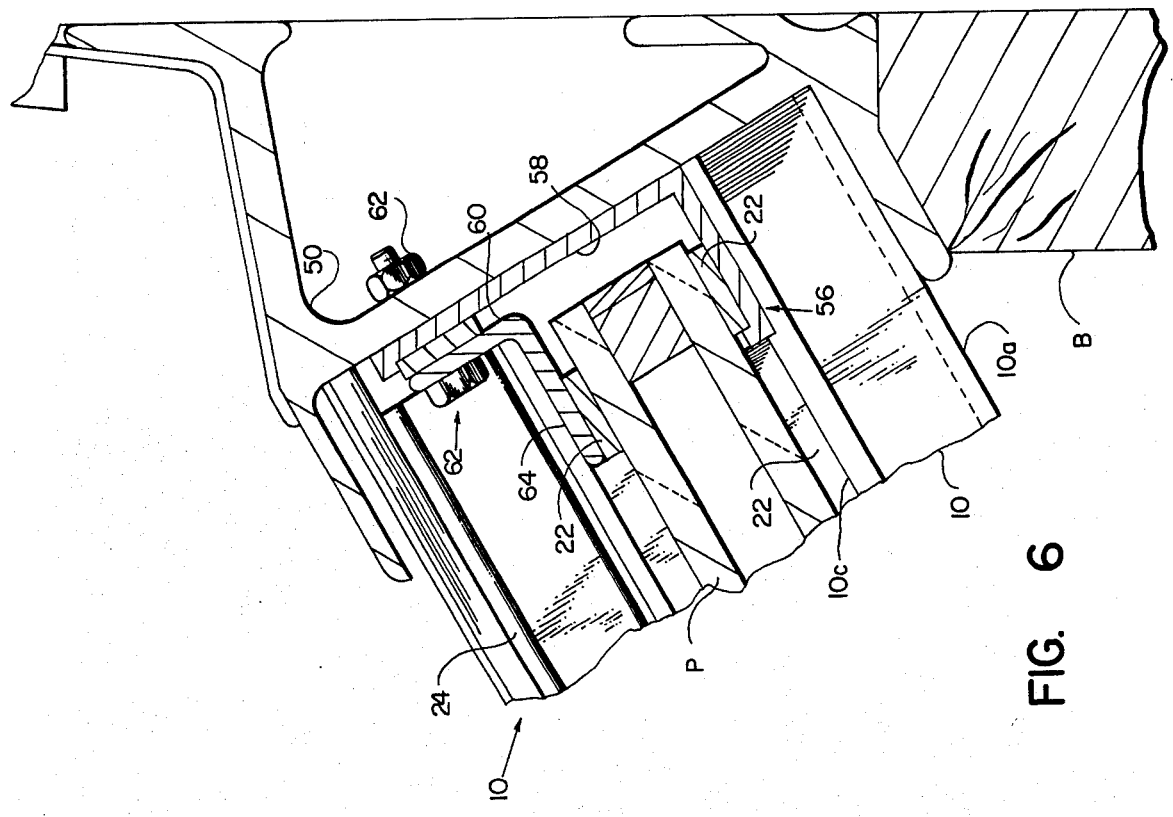
FIG. 6 illustrates the upper portion of the sloped glazing structure and particularly the top rail for attachment thereof to the vertical wall structure.
Figure 7:
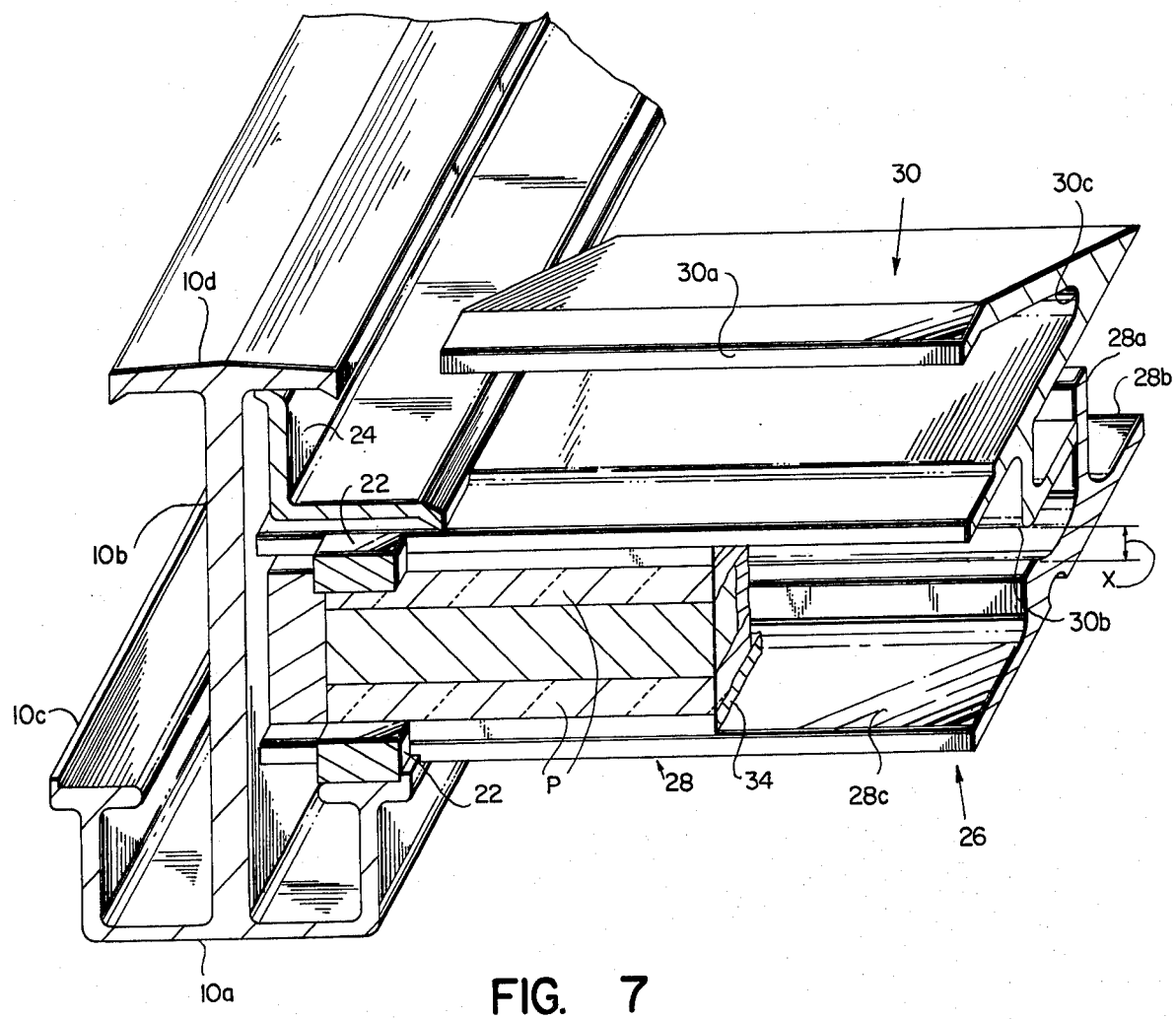
FIG. 7 is a sectional perspective view through a rafter, and also showing a purlin means between two adjacent glazed panels, portions of the panels being broken away to reveal the construction of the two piece purlin means.

As mentioned previously several rafters 10, 10 extend upwardly and rearwardly in an inclined fashion from the horizontally extending upper surface of the sill 16. The sill 16 includes a rear inclined flange 16h which flange is adapted to be secured to a portion of the rafter 10 by conventional fastener means 20 as best shown in FIG. 4. FIGS. 3 and 7 illustrate the cross sectional configuration for the rafter 10 and FIG. 3 also illustrates a slightly different cross sectional configuration for the endmost rafter 11. The majority of the rafters 10, 10 are of inverted T-shape cross sectional shape such that laterally projecting lower portions 10a define channels on either side of a vertically extending stem portion 10b. Each rafter channel defining portion has a glazing support surface 10c for receiving the inclined glazing panel, and more particularly the lower surface of the inclined edge portion thereof. One quarter inch Butyl tape is provided between the underside of each panel P and the glazing support surface 10c of the rafter to seal the area between the panel and such upper surface 10c. Such a tape is illustrated generally at 22 in FIGS. 4, 5 and 6. The use of such heavy Butyl tape provides a positive seal against leakage by moisture in this area of the sloped glazing structure, and such tape is of such a consistency that it will not dry up, shrink or crack. The inverted T-shaped rafter is preferably fabricated from a heavy duty extruded aluminum alloy (6063-T5) as are other members of the roof structure to be described, including the sill 16 and gutter G described previously. These extruded aluminum members may be anodized in any number of available finishes or provided with a baked enamel finish if preferred in a given situation.

Figure 5:
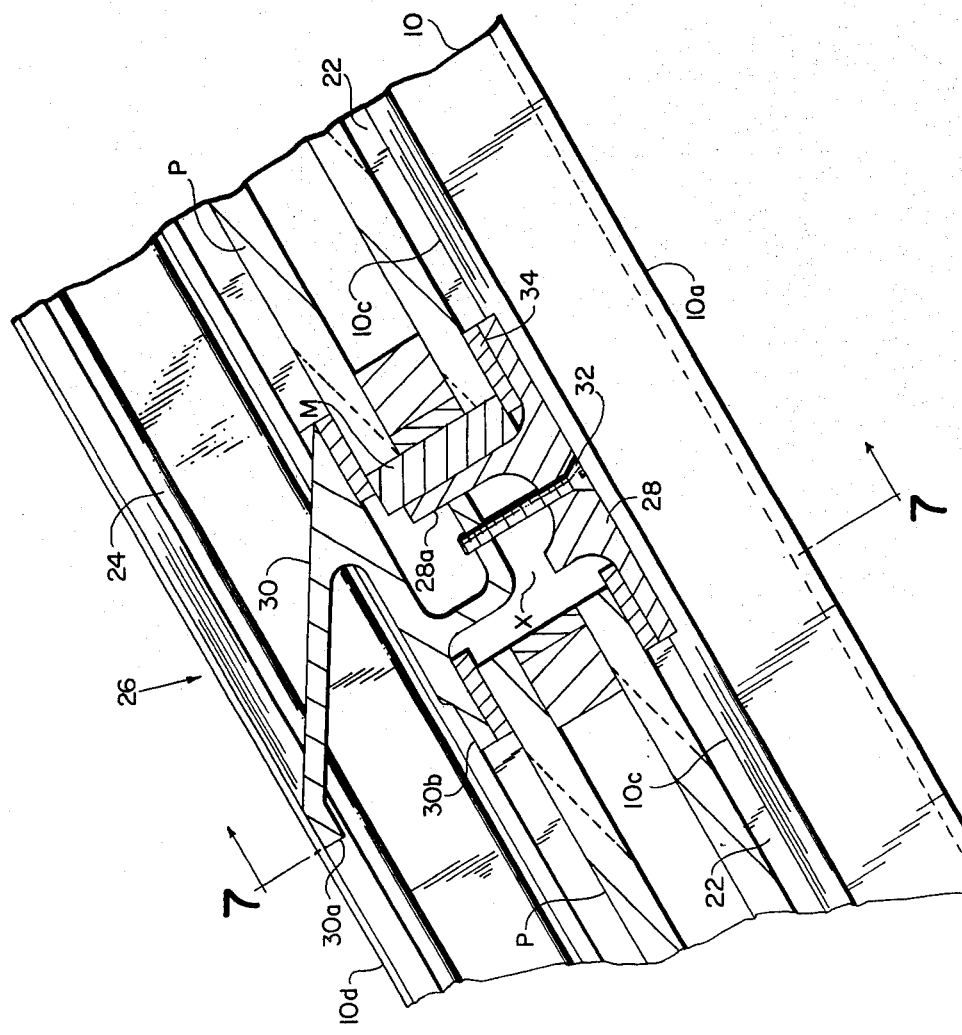
FIG. 5 is a view of the purlin portion of the sloped glazing structure of FIGS. 1 and 2.

Still with reference to the inverted T-shape rafter 10, an integral cap portion 10d is defined by laterally projecting flanges along the upper edge of the stem portion 10b. This cap portion 10d is high enough above the outer surface of the glass panel so as to permit the panel to be placed on the Butyl tape 22 and to permit L-shaped glazing stops 24, 24 to be secured to the rafter stem portion 10b by fasteners, as illustrated at 26 in FIG. 3, and with said quarter inch Butyl tape 22 also provided between the lower flange of the L-shape stop and the upper surface of the glass panel P as shown in FIGS. 4, 5 and 6. As noted previously these L-shaped glass stops 24 extend the full length of the T-shape rafter 10 with the result that external water is carried off efficiently across the joint between the adjacent glass panels as illustrated in some detail in FIG. 7. This run off ultimately runs onto the horizontally extending upper surface 16c of the sill where such water finds its way into the gutter G and may be carried away by conventional downspouts (not shown).

Turning next to a detailed description of the area between the adjacent glazed panels P, P FIGS. 5 and 7 show this area of the sloped glazing structure to include purlin means between adjacent rafters 10, 10 and supporting the adjacent edges of glazing panels P, P.

Each purlin means 26 extends between adjacent rafters 10, 10 as shown in FIG. 1 and the number of purlin means required in a particular sloped glazing structure will be determined by the size of the glass or glazing panels P, P in a particular installation. As shown, a single purlin means is provided between each pair of adjacent rafters 10, 10. As best shown in FIGS. 5 and 7 each of said purlin means includes a lower division bar 28 having a lower surface which is generally flat so as to be received on the tape 22 which tape is provided in the upperwardly facing rail or edge of the glazing panel supporting surface 10c of the rafter 10. In cross sectional shape this lower division bar of the purlin means has a generally L-shape cross section with projecting lower flange portions 28b and 28c having their end portions supported on the adjacent glazing support surfaces of the channel defining rafters. Each lower division bar 28 further includes at least one upwardly extending or projecting flange 28a which flange 28a serves to locate an upper division bar 30 with respect to this lower bar 28. Screw fastener 32 secure the lower bar to the upper bar, and also secure the adjacent marginal edge portions of the glazing panels between flanges defined for this purpose on each of these division bars. Since the lower division bar is itself received on the same edge portion of the rafter 10 which will support the panel P as described previously, the Butyl tape 22 provided in the rafter is somewhat thicker than the Butyl tape 34 provided on the flange 28b and 28c of the lower purlin division bar 28.

Thus, the opposed flange portions of these upper and lower divisions bars 30 and 28 respectively secure the adjacent marginal edges of the glazing panels P, P therebetween as a result of screw fasteners such as shown at 32. The upper division bar 30 has an L-shaped lower projection 30b which defines an opening for threadably receiving the screw 32. The upper division bar also includes a generally V-shaped upper portion 30c one leg of the V serving to define the flanged portions which abut the glazing panels P as described previously, and another leg projecting forwardly from the inclined surfaces of the glazing panels P such that any moisture on the upper glazing panel P will be channelled toward the rafters and thence downwardly into the channel defining portions of the rafters 10, 10 for ultimate passage across the upper horizontal surface 16c of the sill and into the gutter G. Thus, the upper leg of the V in upper division bar 30 may be inclined slightly above the horizontal.

As so constructed and arranged it will be apparent that the purlin means 26 of the present invention will accommodate glazing panels P, P of different thickness. It should be noted that the upper leg of the V-shaped upper division bar is undercut as best shown in FIG. 7 to clear the cap portion 10d of the T-shaped rafter 10 when thicker panels are used. This upper portion 30a of the upper division bar 30 is best shown in FIG. 7 as having end portions terminating short of the glass stop members 24 so that the projecting edge portion 30a of the upper division bar 30 can project beyond (e.g. above) the cap portion 10d of the rafters if as necessary to accommodate relatively thick glazing panels as required in a particular installation. The lower division bar 28 together with the lower leg 30b of the upper V-shaped division bar extend over the channel defining portions 10c of the T-shaped rafter 10 and beneath the L-shaped stop member 24 as shown in FIG. 7. FIG. 7 also shows the relatively thick Butyl tape 22 compressed to a somewhat greater degree than as shown in the above described views 4 and 5, and with the glass panel P being shown broken away to illustrate the spacing X between the upper and lower division bars 28 and 30 comprising the purlin means just described. This configuration provides a very efficient means for clamping the edge portions of the panel P in the area where these panels come together along a horizontal line between the inclined rafters 10, 10.

Turning next to a detailed description of the joint or connection between the glass panels P and the roof framework at the sill 16, FIG. 4 illustrates a preferred form for the stop plate means 40, 42 between the rafters to receive the lower edge of the glazing panel P. As shown, the stop plate means comprises a lower stop plate bar 40 having a flange 40a with end portions received on the glazing support surfaces 10c of the channel defining rafters 10 as described previously with reference to the purlin means shown in FIG. 7. This lower stop plate bar 40 is provided with at least one upwardly projecting flange 40b which flange supports an upper stop bar 42. The upper stop plate bar 42 has a flange 42a parallel to the flange 40a of the lower stop plate bar in order to receive the lower edge portion of the glazed panel P therebetween. The lower stop plate bar 40 preferably has a generally V-shaped configuration in addition to the flange defining portion 40a in order to stiffen the plate means and provide a pleasing appearance externally of the structure. Thus, depending flange 40b of the lower stop plate bar is oriented generally vertically in the assembly shown. This configuration also provides structural strength to the stop plate means an important feature for this lower division bar in order to assist in supporting the weight of the glass panel P. An elastomeric member M may be provided to cushion the lower edge of the panel P.

Turning next to the support for the sloped glazing structure along its upper edge, FIGS. 2 and 6 illustrate details of a horizontally extending top rail 50, which rail has a generally inverted J-shaped cross section and defines vertically spaced lands 52 and 54 which are adapted to abut the existing wall V or the like. A horizontally extending wood or metal beam B may be provided below the top rail 50 and contoured to receive the top rail as shown in FIGS. 2 and 6.

Stop ridge means is provided in the J-shaped top rail and between the rafters to anchor the upper edges of the glass panels P, P. The J-shaped top rail 50 has an elongated horizontally extending opening of channel shape to receive the upper ends of the rafters 10, 10 as best shown in FIG. 6. The stop ridge means and the upper edges of the glass panels are also provided in this channel shape opening of the top rail 50 and the stop ridge means itself comprises a lower bar 56 having a generally L-shaped cross section with one flange facing upwardly to receive the glass panel P and with end portions adapted to be received on the adjacent glazing support surfaces 10c of the T-shaped rafter 10. This lower L-shaped stop ridge bar 56 has another flange 58, of somewhat greater lateral dimension, secured to the inner boundary of the channel shaped opening in the top rail itself. Still with reference to the stop ridge means provided in the top rail 50 an upper stop ridge bar 60 also of L-shape has one flange secured to the flange 58 of the lower stop ridge bar by fastener means 62 as best shown in FIG. 6. As so constructed and arranged the parallel flanges 56 and 64 of these upper and lower stop bridge bars 60 and 58 respectively are adapted to secure the panel P therebetween with a Butyl tape provided between the metal and the glass surfaces as described above with reference to the one eighth inch tape 34.

I claim:

1. A sloped glazing structure adapted to support glazed panels and comprising an elongated horizontally extending sill defining a dpending channel in its lower surface to receive a wall structure, said sill including a generally flat horizontally extending upper surface, said sill including an edge portion projecting beyond said depending channel to form at least a part of external gutter means for the sloped structure, rafters perpendicular said sill and sloping upwardly from said sill upper surface at an angle of at least 30 degrees thereto, each said rafter having a generally inverted T-shaped cross sectional shape such that laterally projecting lower portions of said T-shaped rafter define channels on either side of a vertically extending stem portion of said T-shape, each rafter channel defining portion having a support surface, each rafter stem portion further including an integral cap portion defined by laterally projecting flanges along the upper edge of said stem portion, L-shaped glazing stops secured to said rafter stem portions below said cap portions thereof to abut inclined lower edge portions of the glazed panel, horizontally extending purlin means between said rafters, said purlin means comprising a lower division bar having lower opposed flanged portions and defining a flat lower surface, said lower division bar flanged portions having end portions received on adjacent support surfaces of said channel defining rafters, each lower division bar further including at least one upwardly projecting flange, said purlin means further comprising an upper division bar secured to the lower bar and having flanged portions which cooperate with said flanged portions of said lower division bar to receive the glazed panel therebetween, at least one horizontally extending top rail having vertically spaced lands to abut an existing wall or the like, said top rail defining an elongated opening of channel shape to receive the upper ends of said rafters, and stop ridge means between said rafters and in said top rail channel, said stop ridge means comprising a lower stop ridge bar of L-shape with one flange facing upwardly, said one flange having end portions received on adjacent glazing support surfaces of said channel defining rafters, said L-shaped lower stop ridge bar having another flange secured to said top rail at the inner boundry of said channel shaped opening thereof.

2. The sloped glazing structure of claim 1 further characterized by stop plate means between said rafters and adjacent said upper sill surface, said stop plate means comprising a lower stop plate bar having a flange with end portions received on adjacent glazing support surfaces of said channel defining rafters, each said lower stop plate bar having at least one upwardly projecting flange, said stop plate means further including an upper stop plate bar secured to the lower stop plate bar and having a flange which cooperates with said flange of said lower stop plate bar to receive a lower edge portion of a glazed panel therebetween.

3. The sloped structure of claim 2 further characterized by at least one elongated horizontally extending top rail having vertically spaced lands to abut an existing wall or the like, said top rail defining an elongated opening of channel shape to receive the upper ends of said rafters.

4. The sloped glazing structure of claim 2 further characterized by stop ridge means between said rafters and in said top rail channel, said stop ridge means comprising a lower stop ridge bar of L-shape with one flange facing upwardly, said one flange having end portions received on adjacent glazing support surfaces of said channel defining rafters, said L-shaped lower stop ridge bar having another flange secured to said top rail at the inner boundary of said channel shaped opening thereof.

5. The sloped glazing structure of claim 4 wherein said stop ridge means further comprises a upper stop ridge bar also of L-shape with one flange facing downwardly and another flange adjacent said another flange of said lower stop ridge bar and secured thereto.

6. A sloped glazing structure adapted to support glazed panels and comprising an elongated horizontally extending sill defining a depending channel in its lower surface to receive a wall structure, said sill including a generally flat horizontally extending upper surface, said sill including an edge portion projecting beyond said depending channel to form at least a part of external gutter means for the sloped structure, rafters perpendicular said sill and sloping upwardly from said sill upper surface at an angle of at least 30 degrees thereto, each said rafter having a generally inverted T-shaped cross sectional shape such that laterally projecting lower portions of said T-shaped rafter define channels on either side of a vertically extending stem portion of said T-shape, each rafter channel defining portion having a glazing support surface for receiving an inclined lower edge portion of a glazed panel, each rafter stem portion further including an integral cap portion defined by laterally projecting flanges along the upper edge of said stem portion, L-shaped glazing stops secured to said rafter stem portions below said cap portions thereof to abut inclined edge portions of the glazed panel, and at least one elongated horizontally extending top rail having vertically spaced lands to abut an existing wall or the like, said top rail defining an elongated opening of channel shape to receive the upper ends of said rafters stop ridge means between said rafters and in said top rail channel, said stop ridge means comprising a lower stop ridge bar of L-shape with one flange facing upwardly, said one flange having end portions received on adjacent glazing support surfaces of said channel defining rafters, said L-shaped lower stop ridge bar having another flange secured to said top rail at the inner boundary of said channel shaped opening thereof.

7. The sloped glazing structure of claim 6 wherein said stop ridge means further comprises a upper stop ridge bar also of L-shape with one flange facing downwardly and another flange adjacent said another flange of said lower stop ridge bar and secured thereto.

* * * * *